United States Patent
Kasahara et al.

(10) Patent No.: US 6,804,469 B2
(45) Date of Patent: Oct. 12, 2004

(54) SUPERVISORY SYSTEM OF OPTICAL AMPLIFIER REPEATER SYSTEM AND SUPERVISORY METHOD OF OPTICAL AMPLIFIER REPEATER SYSTEM

(75) Inventors: Yasunori Kasahara, Tokyo (JP); Hideki Goto, Tokyo (JP); Takashi Mizuochi, Tokyo (JP); Kenkichi Shimomura, Tokyo (JP); Yukio Horiuchi, Saitama (JP); Masatoshi Suzuki, Saitama (JP); Daishi Ishii, Tokyo (JP); Toshio Kawazawa, Tokyo (JP)

(73) Assignees: Mitsubishi Denki Kabushiki Kaisha, Tokyo (JP); KDDI Corporation, Tokyo (JP); KDD Submarine Cable Systems Inc., Tokyo (JP)

( * ) Notice: Subject to any disclaimer, the term of this patent is extended or adjusted under 35 U.S.C. 154(b) by 576 days.

(21) Appl. No.: 09/891,251

(22) Filed: Jun. 27, 2001

(65) Prior Publication Data
US 2002/0021473 A1 Feb. 21, 2002

(30) Foreign Application Priority Data
Jun. 27, 2000 (JP) ...................................... 2000-192788

(51) Int. Cl.[7] .............................................. H04B 10/02
(52) U.S. Cl. ....................... 398/177; 398/173; 398/181; 398/6; 398/11; 398/18; 398/30; 398/33; 398/37; 359/333; 359/341.1; 359/341.3; 359/341.4; 359/337
(58) Field of Search ................................ 398/173, 177, 398/181, 6, 30, 11, 18, 33, 37; 359/333, 341.4, 341.1, 341.3, 337

(56) References Cited
U.S. PATENT DOCUMENTS 5,440,418 A * 8/1995 Ishimura et al. ............ 398/181
5,500,756 A 3/1996 Tsushima et al.
5,535,037 A 7/1996 Yoneyama
5,737,118 A * 4/1998 Sugaya et al. .......... 359/341.43
5,784,192 A 7/1998 Sugiyama et al.
6,366,381 B1 * 4/2002 Anderson .................... 398/180
6,404,527 B1 * 6/2002 Jensen ........................ 398/177

FOREIGN PATENT DOCUMENTS

| JP | 4-371030 | 12/1992 |
|---|---|---|
| JP | 7-177201 | 7/1995 |
| JP | 7-202954 | 8/1995 |

* cited by examiner

Primary Examiner—Hanh Phan
(74) Attorney, Agent, or Firm—Oblon, Spivak, McClelland, Maier & Neustadt, P.C.

(57) ABSTRACT

A supervisory system and supervisory method of an optical amplifier repeater are proposed that can implement operation supervision taking account of the characteristics of individual supervisory targets of the optical amplifier repeater, thereby achieving higher reliability. The supervisory system includes an optical transmitter for transmitting an optical signal including an operation command to notify of a state of a supervisory target; an optical amplifier repeater that transmits a response optical signal including a response code obtained by measuring the supervisory target in response to the operation command; an optical receiver for receiving the response optical signal via an optical fiber and an information processing unit for converting the response code into a numerical form by using a predetermined expression that links the response code with measured information obtained by measuring in advance the supervisory target with an external measuring device during operation of the optical amplifier repeater in response to the operation command.

8 Claims, 11 Drawing Sheets

SUPERVISORY SYSTEM OF OPTICAL AMPLIFIER REPEATER SYSTEM AND SUPERVISORY METHOD OF OPTICAL AMPLIFIER REPEATER SYSTEM

BACKGROUND OF THE INVENTION

1. Field of the Invention

The present invention relates to supervisory control of an optical amplifier repeater system, and particularly to a supervisory system and supervisory method of an optical amplifier repeater system used for long distance optical communications through a submarine cable laid on an ocean floor and the like.

2. Description of Related Art

Figure 8:
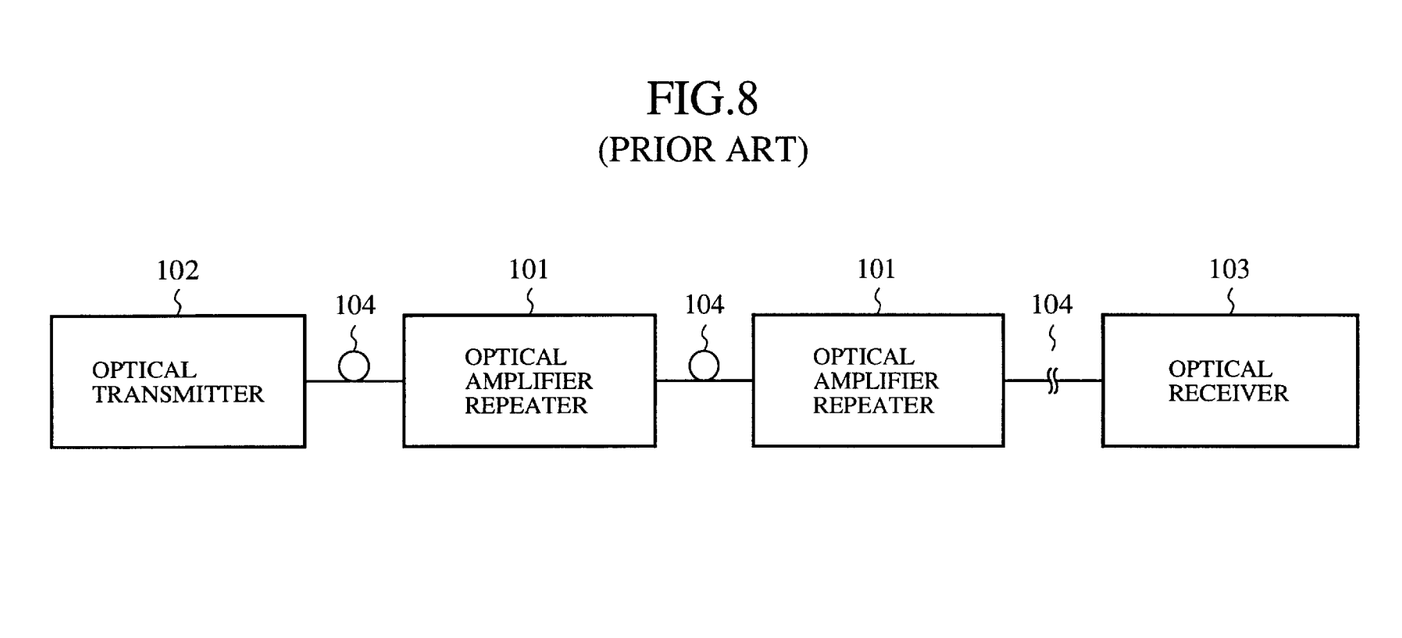
FIG. 8 is a block diagram showing a configuration of a conventional supervisory system of an optical amplifier repeater system.
Figure 9:
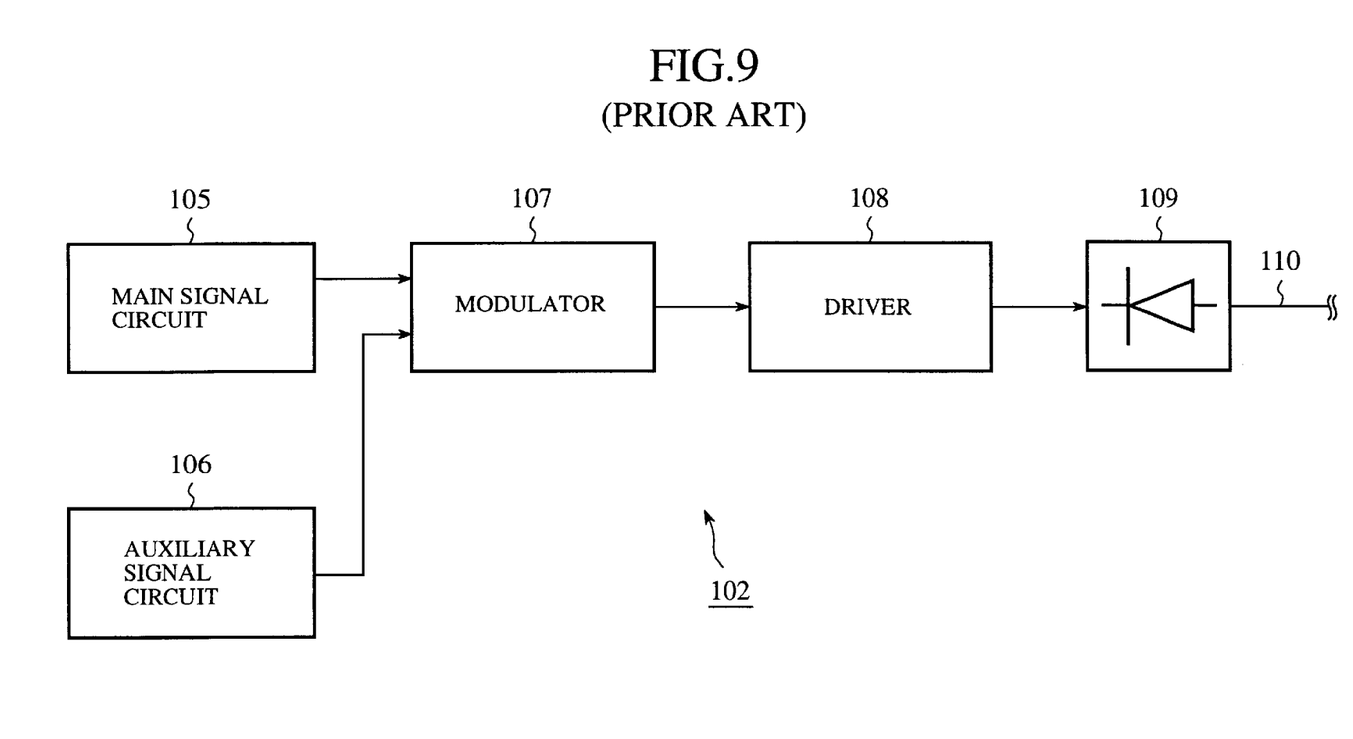
FIG. 9 is a block diagram showing a configuration of an optical transmitter as shown in FIG. 8.
Figure 10:
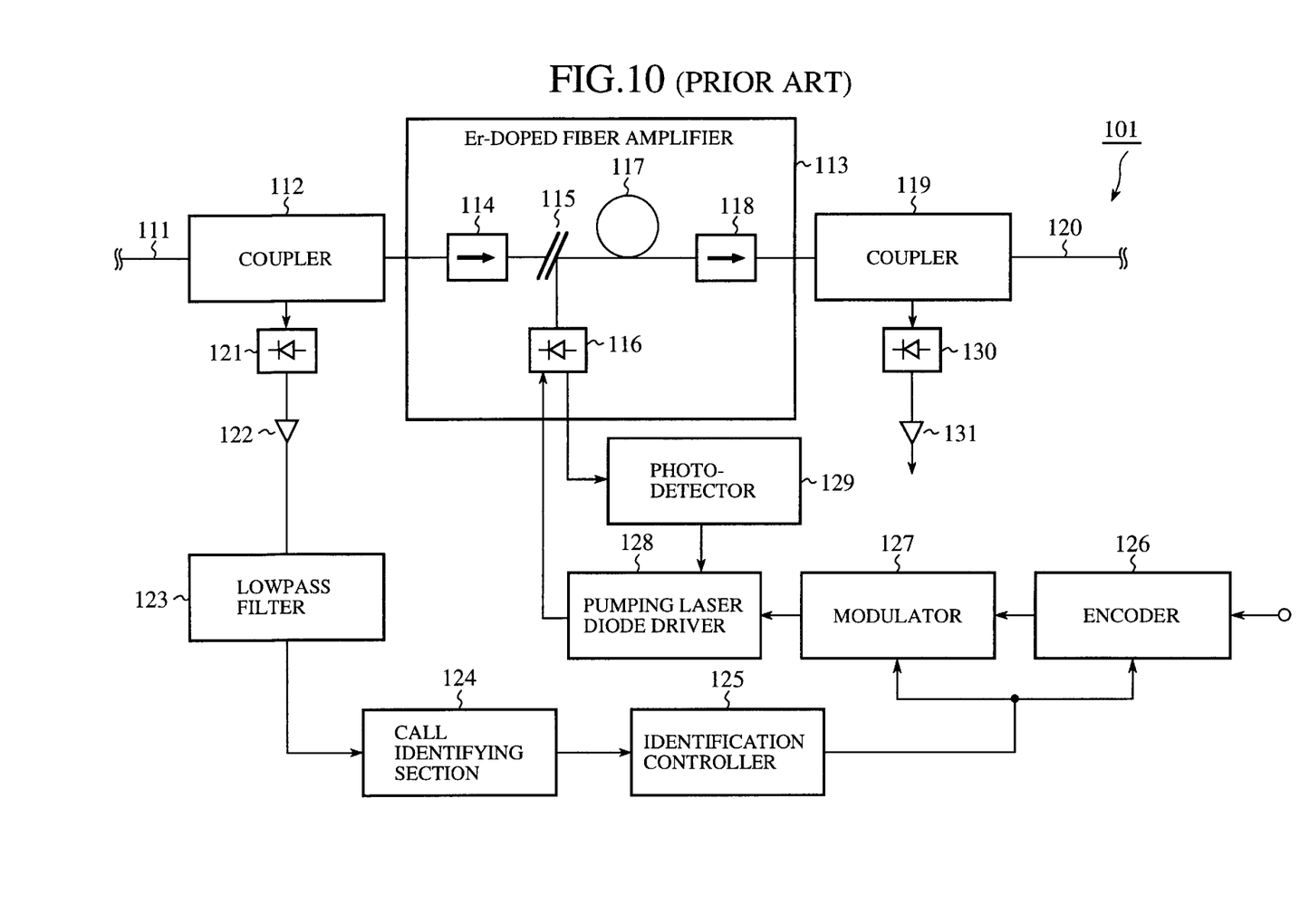
FIG. 10 is a block diagram showing a configuration of an optical amplifier repeater as shown in FIG. 8.
Figure 11:
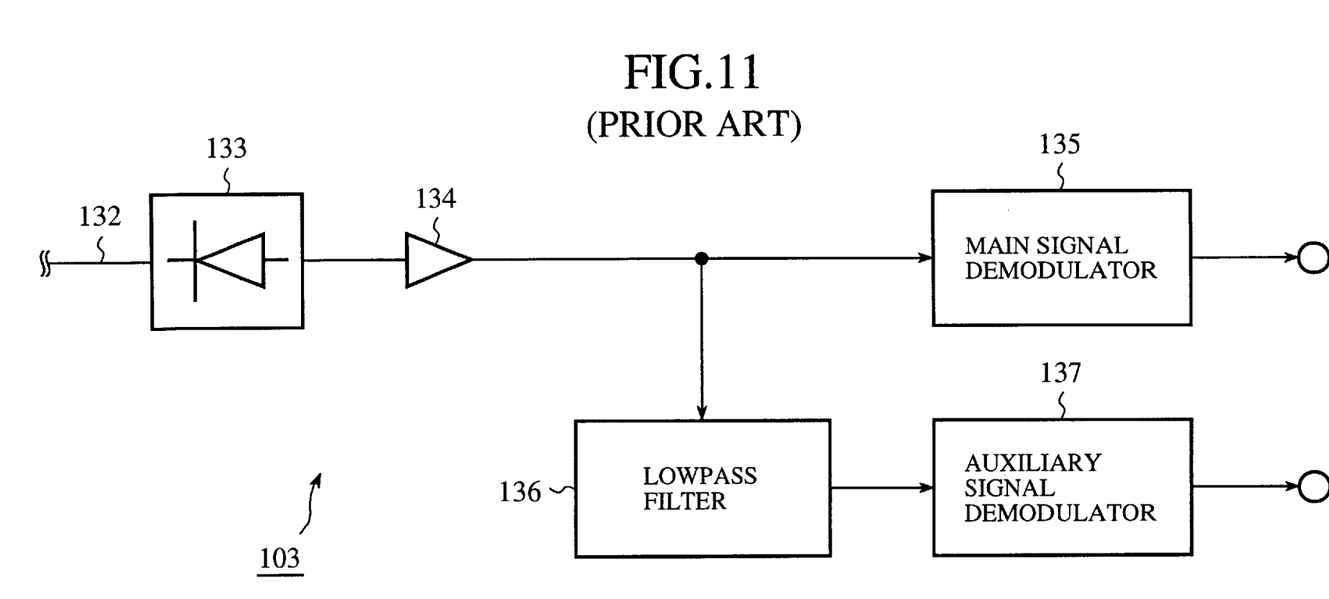
FIG. 11 is a block diagram showing a configuration of an optical receiver as shown in FIG. 8.

FIGS. 8–11 are block diagrams showing a conventional supervisory system of the optical amplifier repeater system: FIG. 9 is a block diagram showing the optical transmitter as shown in FIG. 8; FIG. 10 is a block diagram showing an optical amplifier repeater as shown in FIG. 8; and FIG. 11 is a block diagram showing the optical receiver as shown in FIG. 8. In FIG. 8, each reference numeral 101 designates an optical amplifier repeater, the reference numeral 102 designates an optical transmitter, 103 designates an optical receiver and 104 designates a transmission fiber. The optical amplifier repeater 101, receiving an optical signal from the optical transmitter 102 through the transmission fiber 104, amplifies the optical signal, and supplies it to the transmission fiber 104 on the side of the optical receiver 103.

Next, the operation of the supervisory system of the optical amplifier repeater system as shown in FIG. 8 will be described. First, the operation of the optical transmitter 102 will be described with reference to FIG. 9. A main signal circuit 105 outputs a main signal bearing transmitted information, and an auxiliary signal circuit 106 outputs an auxiliary signal with a lower rate and smaller amplitude than the main signal. The two signals are superimposed so that a modulator 107 modulates the multiplexed signal. A driver 108 drives a semiconductor laser 109 in response to the modulated signal to generate the optical signal. The optical signal is transferred to the transmission fiber 104 (shown in FIG. 8) via an internal transmission fiber 110.

Here, the optical signal output from the semiconductor laser 109 includes a main optical signal and an auxiliary optical signal generated by the electric-optic conversion of the main signal and auxiliary signal, respectively. Thus, the optical signal has such a waveform as modulated by the main signal, on which the low rate auxiliary signal of a small modulation factor is superimposed.

The auxiliary signal from the auxiliary signal circuit 106 consists of an operation command for the individual sections or circuits constituting each optical amplifier repeater 101 to inform about their states for monitoring them. The auxiliary signal includes one of proper address codes uniquely assigned to individual optical amplifier repeaters 101 in advance to specify the optical amplifier repeater 101 to be activated.

When the optical transmitter 102 activates a particular optical amplifier repeater 101 by providing the auxiliary signal with one of the address codes proper to the optical amplifier repeater 101, it must consider a time period the optical amplifier repeater 101 will take to execute the command and to make a response, and transmits the subsequent operation commands to other optical amplifier repeaters 101 at suitable intervals to avoid overlapping of the response optical signals from a plurality of optical amplifier repeaters 101.

Next, the operation of the optical amplifier repeater 101 will be described with reference to FIG. 10. The optical amplifier repeater 101 receives the optical signal via the transmission fiber 104 of FIG. 8. A coupler 112 connected to an internal input fiber 111 splits the optical signal, and provides only a small part of the optical signal to a photoelectric converter 121. Most of the optical signal is supplied to an erbium doped fiber amplifier 113.

The optical signal entering the erbium doped fiber amplifier 113 passes through an optical isolator 114, is coupled by a coupling filter 115 with pumping light fed from a pumping laser diode 116, amplified by an erbium doped fiber 117, and passes through an optical isolator 118. A coupler 119 splits the optical signal to extract only a small part of the optical signal as feedback control information. Most of the optical signal is transferred to the transmission fiber 104 as shown in FIG. 8 via an output fiber 120.

The photoelectric converter 121 converts the part of the optical signal into an electric signal, and supplies it to an amplifier 122. The amplifier 122 amplifies the electric signal by a prescribed amount, and supplies it to a lowpass filter 123. The lowpass filter 123 detects the auxiliary signal from the electric signal, and supplies it to a call identifying section 124. The call identifying section 124 compares the address code in the auxiliary signal with the address code of the optical amplifier repeater to identify it, and supplies the identification result to an identification controller 125.

Subsequently, when the identification result of the call identifying section 124 indicates the agreement between the address codes, the identification controller 125 carries out the operation command. For example, when the operation command instructs the notification of level states, the identification controller 125 activates an encoder 126 and a modulator 127 to encode supervisory information indicating whether the levels of various portions are higher or lower than initially set values, and to modulate it to be supplied to the pumping laser diode driver 128.

The pumping laser diode driver 128 drives the pumping laser diode 116 in accordance with the modulation signal fed from the modulator 127, and outputs the pumping light which also serves as a response optical signal including the supervisory information. The coupling filter 115 combines the transmitted optical signal with the pumping light to be supplied to the erbium doped fiber 117.

Thus, the erbium doped fiber 117 amplifies the optical signal based on the pumping light bearing the response optical signal. The amplified optical signal is supplied to the transmission fiber 104 through the output fiber 120.

A photoelectric converter 130, receiving part of the optical signal extracted by the coupler 119, converts the optical signal into an electric signal. An amplifier 131 amplifies the electric signal and supplies it to a feedback controller (not shown). A photodetector 129 detects the output of the pumping laser diode 116, and feeds the detected signal back to the pumping laser diode driver 128.

Next, the operation of the optical receiver 103 will be described with reference to FIG. 11. In the optical receiver 103 that receives the optical signal sent from the optical amplifier repeater 101 through the transmission fiber 104 as shown in FIG. 8, a photoelectric converter 133 receives the optical signal through an internal transmission fiber 132, and converts it into an electric signal. Since the optical signal includes the main optical signal and response optical signal corresponding to the main signal and response signal, they are extracted as the main electric signal and response electric signal.

Subsequently, the amplifier 134 amplifies the electric signals by a prescribed amount. The amplified main electric signal is demodulated by a main signal demodulator 135 as the main signal. A low pass filter 136 extracts the response electric signal. An auxiliary signal demodulator 137 demodulates the response electric signal and outputs the supervisory information. The supervisory information is used as supervisory/control information when operating the optical amplifier repeater 101.

As described above, according to the conventional supervisory system of the optical amplifier repeater system, each optical amplifier repeater 101 encodes the states of the various sections and circuits in response to the request for the state notification, and transmits the information about the states to the optical receiver 103. For example, to implement a desired supervisory function such as temperature control, a straightforward measuring and controlling circuit. However, installing such a circuit will increase the scale of the repeater supervisory circuit, presenting a problem of increasing the size of the repeater.

In addition, as for gain variations, temperature compensation and the like due to characteristic changes with time during operation, since their control system constitutes a closed control system in the supervisory circuit in the optical amplifier repeater, a problem arises in that it is unsuitable for a land side supervisory system (not shown) to monitor the operation states and to control the optical amplifier repeater in response to the supervisory information. Accordingly, it is difficult for the optical amplifier repeater to implement high reliability that enables a long term operation, and to stabilize the gain against the changes with time in the characteristics of the components and circuits during the operation.

Furthermore, to notify of the supervisory states quantitatively, an increasing amount of information is required for the optical amplifier repeater, which presents a problem in that the response signal can have an adverse effect on the main signal.

Moreover, considering the operation time of the optical amplifier repeater to execute the operation command and the arrival time of the response optical signal, the optical transmitter must place certain intervals between transmissions of successive operation commands to the optical amplifier repeater to prevent the optical signal traveling through the optical fiber 104 from including many auxiliary optical signals or response optical signals at the same time, which presents a problem of hindering efficient operation.

SUMMARY OF THE INVENTION

The present invention is implemented to solve the foregoing problems. It is therefore an object of the present invention to provide a supervisory system and a supervisory method of an optical amplifier repeater system capable of achieving operation supervision considering characteristics of individual supervisory targets in the optical amplifier repeater, thereby improving its reliability. Another object of the present invention is to provide a supervisory system and a supervisory method of the optical amplifier repeater system capable of implementing gain stabilization and temperature compensation against changes with time in the characteristics of the individual supervisory targets, thereby implementing high reliability.

According to a first aspect of the present invention, there is provided a supervisory system of the optical amplifier repeater system in an optical transmission system including two terminal stations and at least one optical amplifier repeater connected between the two terminal stations through an optical fiber, the supervisory system of the optical amplifier repeater system comprising: an optical transmitter installed in at least one of the two terminal stations for transmitting to the optical amplifier repeater an optical signal including an operation command to notify of a state of a predetermined supervisory target; a response signal generator installed in the optical amplifier repeater for receiving the optical signal transmitted from the optical transmitter, and for generating a response optical signal including a response code indicative of the state of the supervisory target; an optical receiver installed in at least one of the two terminal stations for receiving the response optical signal transmitted from the optical amplifier repeater; and an information processing unit connected to the optical receiver for generating a numerical form of the response code included in the response optical signal received by the optical receiver by using a predetermined expression that links the response code with measured information obtained by measuring in advance the supervisory target with an external measuring device during operation of the optical amplifier repeater in response to the operation command.

Here, the information processing unit may comprise a storage for recording the expression in advance; an arithmetic unit for converting the response code into the numerical form using the expression; and an arithmetic result output unit for outputting information about the numerical form output from the arithmetic unit.

The expression can be obtained in terms of variations in the response code in response to variations in the measured information about the supervisory target due to ambient temperature changes of the optical amplifier repeater.

The expression can be obtained in terms of variations in the response code in response to variations in the measured information about the supervisory target due to elapsed time.

The supervisory system may comprise a plurality of optical amplifier repeaters installed between the two terminal stations via the optical fiber, and the expression can be obtained for each of the plurality of optical amplifier repeaters to be stored in the storage of the information processing unit.

According to a second aspect of the present invention, there is provided a supervisory method of an optical amplifier repeater in an optical transmission system including two terminal stations and at least one optical amplifier repeater connected between the two terminal stations through an optical fiber, at least one of the two terminal stations including an optical transmitter and an optical receiver, the supervisory method of an optical amplifier repeater comprising the steps of: transmitting from the optical transmitter to the optical amplifier repeater an operation command to notify of a state of a predetermined supervisory target; storing a predetermined expression linking measured information with a response code in advance, the measured information being obtained by measuring the predetermined supervisory target by an external measuring device while the optical amplifier repeater is operating in response to the operation command, and the response code being output from the optical amplifier repeater in response to the operation command; and converting the response code which is sent from the optical amplifier repeater to the optical receiver in response to the operation command, into a numerical form by using the predetermined expression.

Here, the expression can be obtained in terms of variations in the response code in response to variations in the measured information about the supervisory target due to ambient temperature changes of the optical amplifier repeater.

The expression can be obtained in terms of variations in the response code in response to variations in the measured information about the supervisory target due to elapsed time.

DETAILED DESCRIPTION OF THE PREFERRED EMBODIMENTS

The invention will now be described with reference to the accompanying drawings.
Embodiment 1

Figure 1:
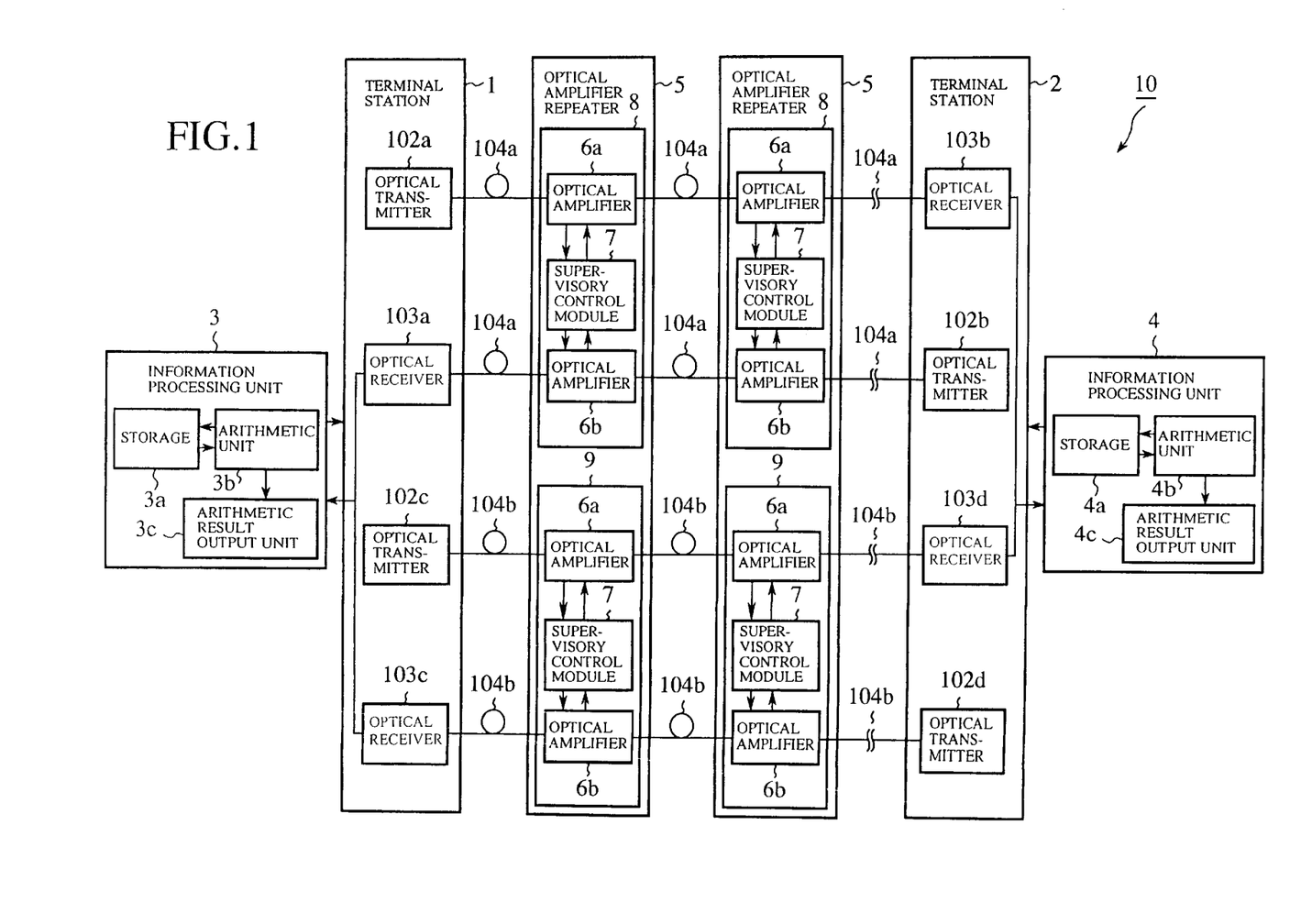
FIG. 1 is a block diagram showing a configuration of an embodiment 1 of a supervisory system and a supervisory method of an optical amplifier repeater system in accordance with the present invention.
Figure 2:
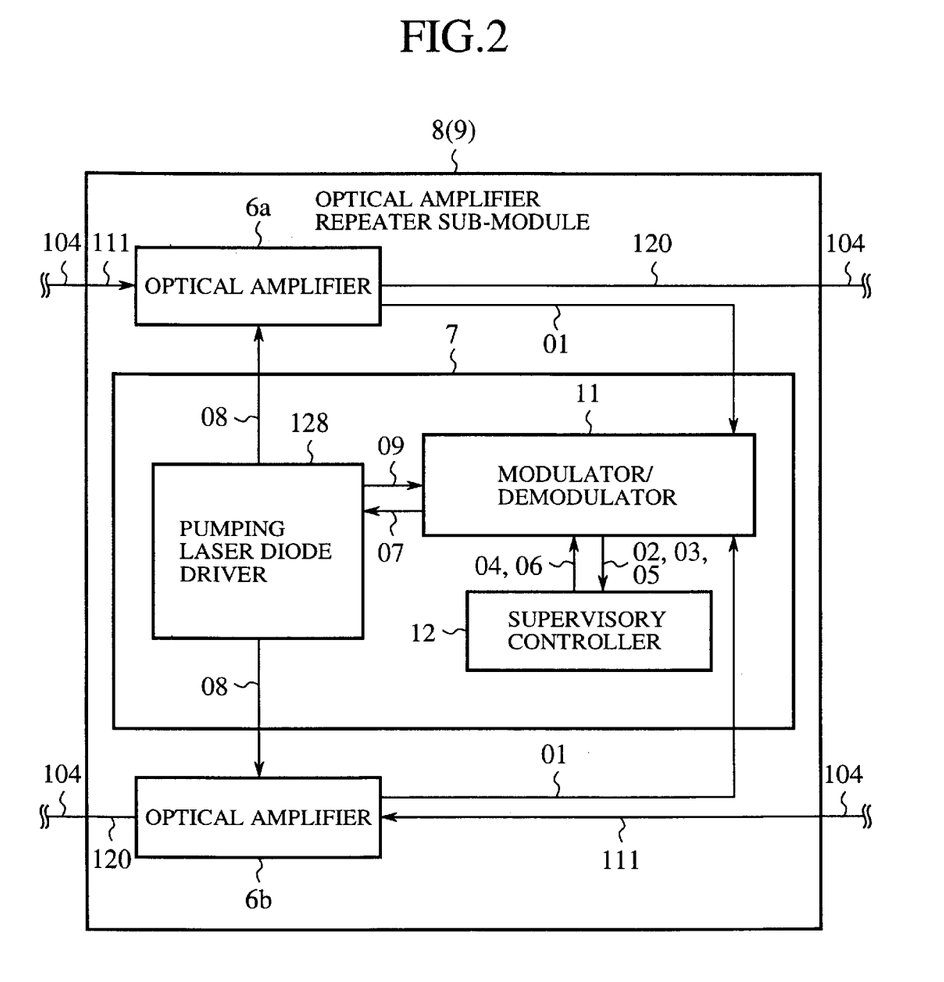
FIG. 2 is a block diagram showing a configuration of an optical amplifier repeater sub-module 8 as shown in FIG. 1.
Figure 3:
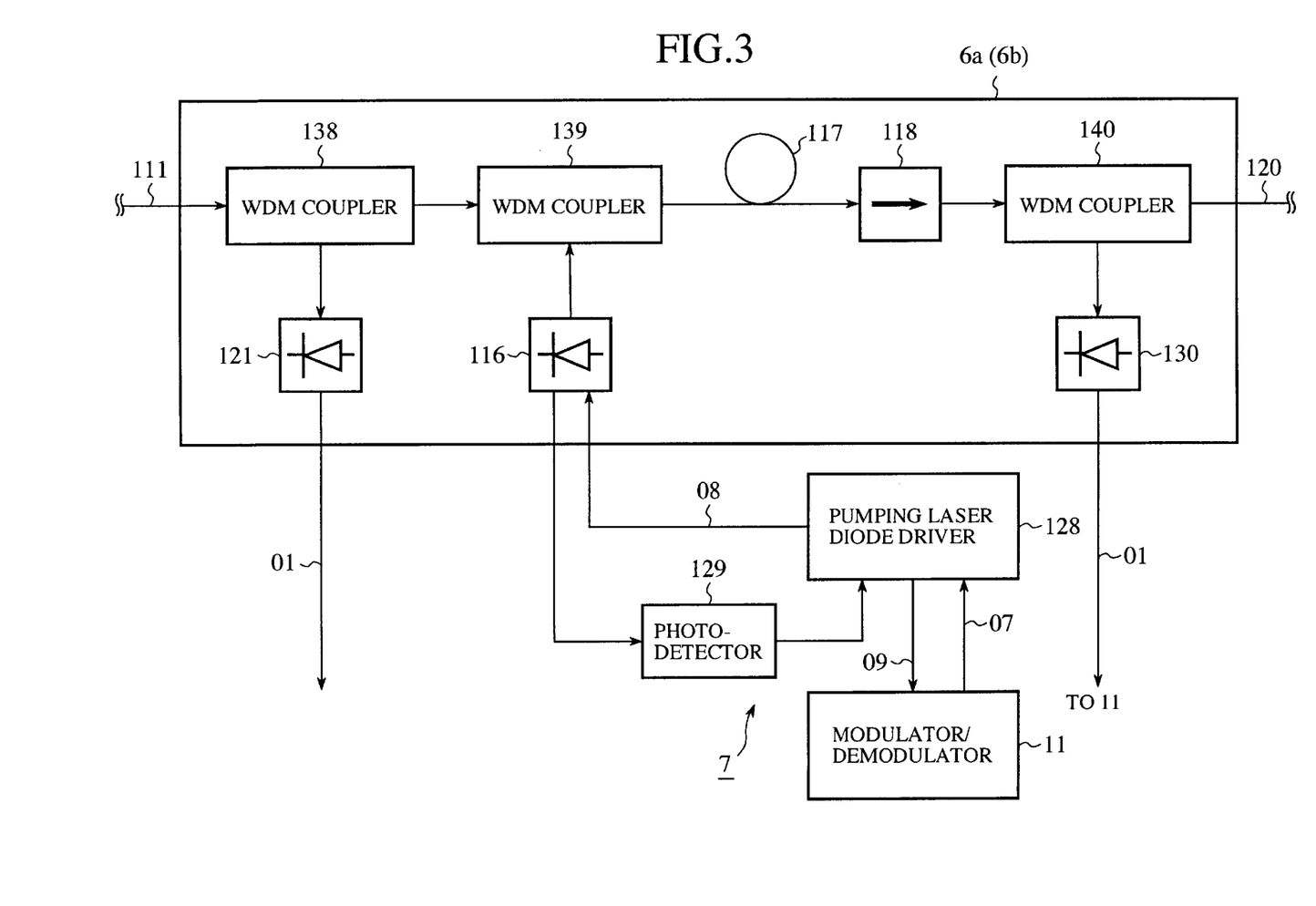
FIG. 3 is a block diagram showing a configuration of a supervisory control module 7 and one of optical amplifiers as shown in FIG. 2.

FIG. 1 is a block diagram showing a configuration of an embodiment 1 of a supervisory system of an optical amplifier repeater system in accordance with the present invention; FIG. 2 is a block diagram showing a configuration of an optical amplifier repeater sub-module 8 or 9 as shown in FIG. 1; and FIG. 3 is a block diagram showing a configuration of a supervisory control module 7 and an optical amplifier 6a or 6b as shown in FIGS. 1 and 2. In these figures, the same reference numerals designate the same or like portions to those of FIGS. 8–11, and the description thereof is omitted here. In FIG. 1, reference numerals 1 and 2 each designates a terminal station such as land-side line supervisory equipment (not shown). They each include a plurality of optical transmitters and optical receivers to carry out optical communications in both the uplink/downlink directions. The present embodiment 1 is assumed to have a pair of bidirectional optical communication channels.

For convenience sake, it is assumed that the direction from left to right corresponds to an uplink, and right to left a down link, and that the bidirectional optical communication channel including an uplink from an optical transmitter 102a to an optical receiver 103b and a downlink from an optical transmitter 102b to an optical receiver 103a is called a first optical communication system; and the bidirectional optical communication channel including an uplink from an optical transmitter 102c to an optical receiver 103d and a downlink from an optical transmitter 102d to an optical receiver 103c is called a second optical communication system.

In FIG. 1, reference numerals 102a–102d each designate an optical transmitter having the same configuration and function as the optical transmitter 102 as shown in FIG. 9. The optical transmitters 102a–102d each transmit an auxiliary signal to a corresponding optical amplifier repeater 5. The auxiliary signal includes a proper address code uniquely assigned to each optical amplifier repeater sub-module 8 (9) in advance, and an operation command requesting the optical amplifier repeater sub-module 8 (9) to notify of the states of predetermined supervisory targets.

Reference numerals 103a–103d each designate an optical receiver having the same configuration and function as the optical receiver 103 as shown in FIG. 11.

The reference numeral 104a designates an optical fiber pair consisting of uplink/downlink optical transmission fibers 104 of the first optical communication system; and 104b designates an optical fiber pair consisting of uplink/downlink optical transmission fibers 104 of the second optical communication system.

Reference numerals 3 and 4 designate information processing units connected to the terminal stations 1 and 2, respectively. The information processing units 3 and 4 comprise storages 3a and 4a, arithmetic units 3b and 4b and arithmetic result output units 3c and 4c, respectively.

Figure 5:
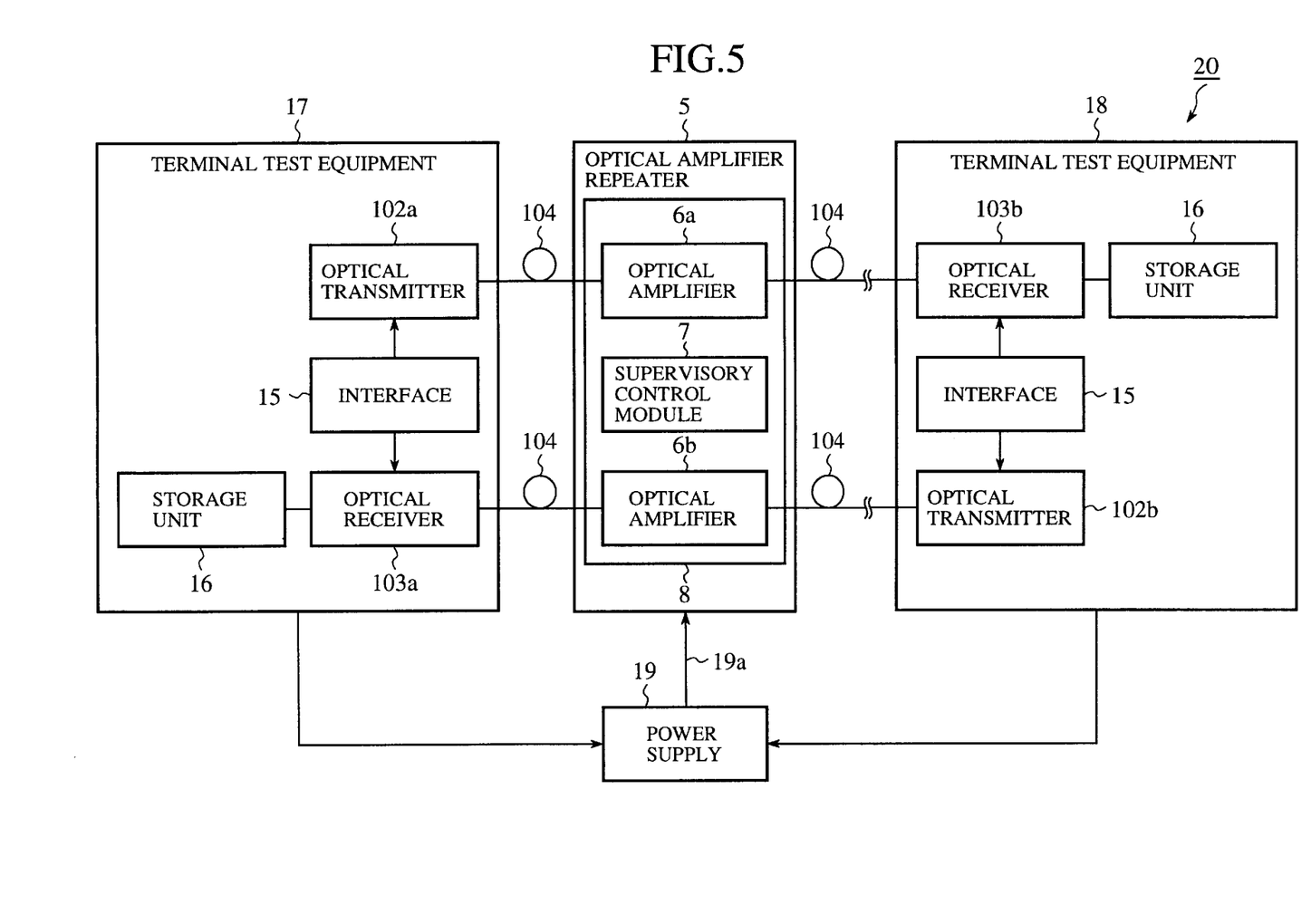
FIG. 5 is a block diagram showing a configuration of an optical communication test system used for the present invention.

The storages 3a and 4a record a plurality of prescribed expressions (called identifying expressions from now on) obtained in advance for individual predetermined supervisory targets. The identification expressions are obtained by collecting characteristic data of individual supervisory targets in advance by using an optical communication test system as shown in FIG. 5 for collecting information. The identification expressions represent relationships between measured information items and response codes. Here, the measured information items are obtained by measuring the supervisory targets by an external measuring device during the operation of the optical amplifier repeater 5 in response to the operation command from the optical transmitter 102a, and the response codes are obtained from the optical amplifier repeater 5 at the operation. In this way, it becomes possible to quantitatively grasp the states of the supervisory targets.

The arithmetic units 3b and 4b each convert the response codes using the identification expressions to generate the supervisory information that enables capturing the states of the supervisory targets quantitatively.

The arithmetic result output units 3c and 4c each output the supervisory information fed from the arithmetic units 3b and 4b during the operation.

Next, each reference numeral 5 designates an optical amplifier repeater for amplifying and outputting optical signals attenuated through the transmission fiber 104. Although two optical amplifier repeaters 5 are disposed in the present embodiment 1 for convenience sake, the number of them is not limited to two, but any number of them can be installed as necessary in accordance with the distance between the terminal stations 1 and 2.

Reference numerals 6a and 6b each designate an optical amplifier: 6a designates an uplink optical amplifier; and 6b designates a downlink optical amplifier.

Each reference numeral 7 designates a supervisory control module that stores the proper address code uniquely assigned to its own optical amplifier repeater sub-module 8 or 9 in advance. The supervisory control module 7 controls and monitors the optical amplifiers 6a and 6b.

Reference numerals 8 and 9 each designate the optical amplifier repeater sub-module comprising the optical amplifier 6a and 6b and the supervisory control module 7. The optical amplifier repeater sub-module 8 is connected to the first optical communication system, and the optical amplifier repeater sub-module 9 is connected to the second optical communication system. The reference numeral 10 designates the supervisory system of the optical amplifier repeater system comprising the foregoing components 1–9, 104a and 104b.

In FIG. 2, the reference numeral 11 designates a modulator/demodulator for demodulating the electric signal 01 fed from a photoelectric converters 121 in the optical amplifier 6a (6b) as shown in FIG. 3, and supplies it to a supervisory controller 12. The modulator/demodulator 11 also modulates the response signal including the response codes and the like.

The reference numeral 12 designates the supervisory controller comprising a memory (not shown) for storing a control program and a processing unit (not shown). The supervisory controller 12 initializes the processing unit and peripheral circuits (not shown), stores the supervisory information on the peripheral circuits, and carries out input/output control of the processing unit and output control of the response codes. The reference numeral 128 designates a pumping laser driver which will be described later.

The supervisory control module 7 comprises the components 11, 12 and 128.

In FIG. 3, reference numerals 138–140 each designate a wavelength-division multiplexing coupler (called WDM coupler from now on) for multiplexing and demultiplexing the optical signals or signal.

Figure 4:
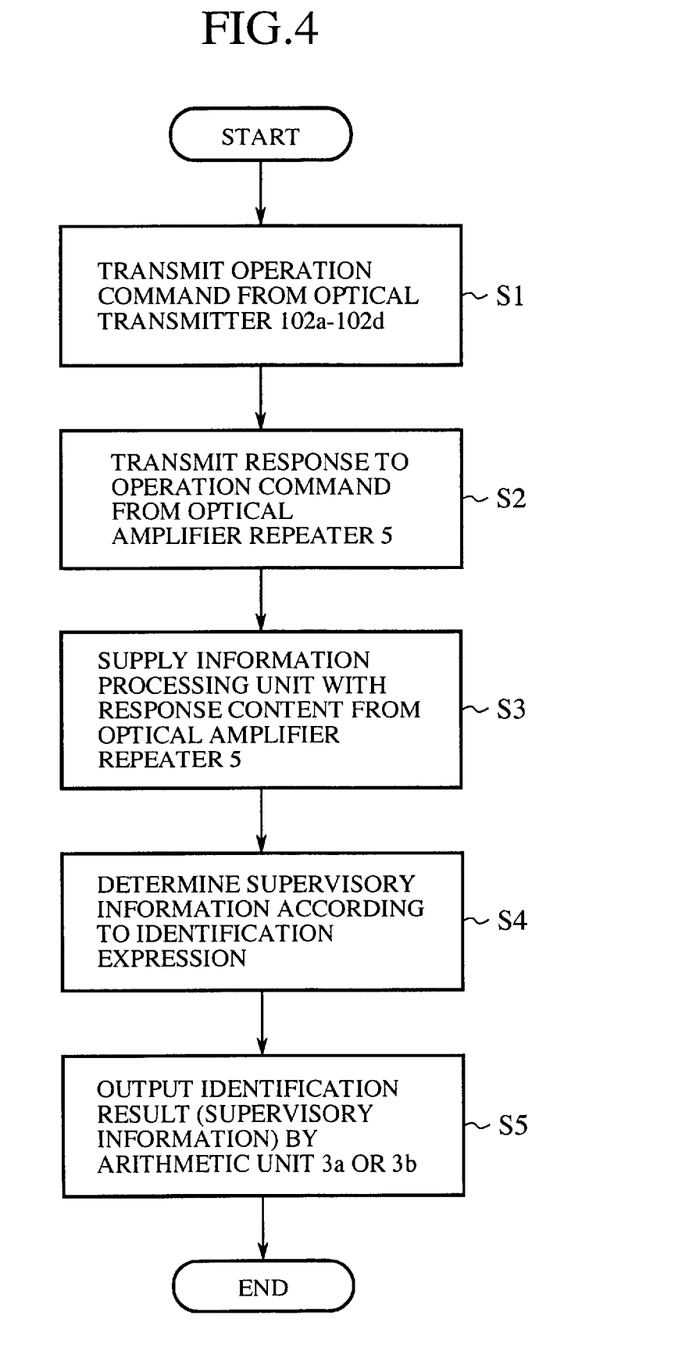
FIG. 4 is a flowchart illustrating the supervisory method of an optical amplifier repeater of the embodiment 1 in accordance with the present invention.

Next, the operation of the present embodiment 1 will be described with reference to FIGS. 1–4. FIG. 4 is a flowchart illustrating a supervisory method of the optical amplifier repeater system. First, an outline of the supervisory method will be described with reference to FIG. 4. The optical transmitter 102a of the terminal station 1 operates in the same manner as the optical transmitter 102 as shown in FIG. 8. Thus, it superimposes the auxiliary signal on the main signal for transmitting information (step S1), which auxiliary signal includes the operation command and the address code proper to the optical amplifier repeater sub-module 8 or 9 in the optical amplifier repeater 5.

Subsequently, the optical amplifier repeater 5 whose address code agrees with the address code contained in the optical signal sent from the optical transmitter 102a, carries out the operation command in the same fashion as the optical amplifier repeater 101 as shown in FIG. 8 so that it supplies the optical signal including the response optical signal simultaneously to the uplink/downlink transmission fibers 104 (step S2).

Receiving the optical signal, the optical receiver 103c in the terminal station 1 extracts the response code from the response optical signal in the same manner as the optical receiver 103 as shown in FIG. 8, and supplies it to the information processing unit 3 (step S3).

In response to the address code identifying the optical amplifier repeater 5 and to the code indicating the content of the operation command sent from the repeater 5, the arithmetic unit 3b of the information processing unit 3 extracts the identification expression corresponding to them from the storage 3a, converts the response code into the corresponding numerical form using the identification expression, and outputs it as the supervisory information (step S4).

Receiving the supervisory information in the numerical form from the arithmetic units 3b, the arithmetic result output unit 3c in the information processing unit 3 supplies it to a monitor (not shown) or higher level system (not shown) (step S5).

Next, the operation of the foregoing steps will be described in more detail with reference to FIGS. 1–3. At step S1, the optical transmitter 102a (see, FIG. 1) converts the electric signal, which is obtained by superimposing the auxiliary signal on the main signal bearing main information, into the optical signal, and transmits it to the transmission fiber 104 (see, FIG. 1), the auxiliary signal having a lower rate and smaller amplitude than the main signal.

The operation command transmitted from the terminal station 1 or 2 includes such instructions as the initial setting and presetting of the supervisory controller 12 shown in FIG. 2, instructions for extracting or measuring the characteristic signals about the supervisory targets, instructions for reading out the states of the supervisory targets and maintenance processing including initialization. However, for the sake of simplicity, it is assumed here that the operation command is instructions for measuring output power of the pumping laser diode 116, and the address code contained in the auxiliary signal is the address code of the optical amplifier repeater sub-module 8. In other words, an example will be described in which the terminal station 1 issues a command to the optical amplifier repeater sub-module 8 to measure the output power of the pumping laser diode 116.

Next, the operation in step S2 will be described in more detail with reference to FIGS. 2 and 3. Receiving the optical signal through the input fiber 111, the WDM coupler 138 in the optical amplifier 6a splits the optical signal, and supplies its fragment to the photoelectric converter 121. Most of the optical signal is supplied to the erbium doped fiber 117.

The next WDM coupler 139 couples the optical signal with the pumping light (which also serves as the response optical signal described later) fed from the pumping laser diode 116, and the erbium doped fiber 117 amplifies them. The amplified optical signal passes through the optical isolator 118, and its fragment is extracted by the WDM coupler 140 as the feedback control information. Most of the optical signal is transmitted to the transmission fiber 104 through the output fiber 120.

The photoelectric converter 121 converts the optical signal fed from the WDM coupler 138 into a received signal 01, an electric signal, and supplies it to the modulator/demodulator 11 as shown in FIG. 2.

The modulator/demodulator 11 amplifies the received signal 01 by a prescribed amount with its amplifier (not shown), extracts the auxiliary signal from the received signal 01 using its filter (not shown), converts the auxiliary signal into digital data, and supplies the supervisory controller 12 with the bit-serial digital data as a coded received signal 02.

At the same time, modulator/demodulator 11 extracts a clock signal from the received signal 01 with an internal clock generator (not shown), and generates a return sub-carrier by locking the clock signal with a PLL circuit (not shown) and by carrying out frequency dividing or multiplication. The modulator/demodulator 11 also supplies the supervisory controller 12 with a clock signal 03 corresponding to the clock signal extracted from the received signal 01. The clock signal 03 is used in the supervisory controller 12 as the reference clock signal for arithmetic calculations.

Receiving the coded received signal 02, the supervisory controller 12 compares the address code included in the coded received signal 02 with its own address code, and decides that the operation command is address to itself when the two addresses agree.

Making a decision that the operation command is addressed to itself, the supervisory controller 12 has its processing unit (not shown) decode the operation command in the coded received signal 02 according to the control program stored in its memory (not shown).

In response to the decoded result, the supervisory controller 12 supplies the modulator/demodulator 11 with a supervisory target selection signal 04 instructing to measure the output power of the pumping laser diode 116.

In response to the supervisory target selection signal 04, the modulator/demodulator 11 receives feedback information 09 from the pumping laser driver 128. The feedback information 09 is an output signal of a photodetector 129 that detects the optical output of the pumping laser diode 116 as shown in FIG. 3. In response to the feedback information 09, the modulator/demodulator 11 supplies a measured data signal 05 to the supervisory controller 12.

The supervisory controller 12 converts the analog measured data signal 05 to digital data with an A/D converter (not shown), and provides the digital data with prescribed calculation, thereby generating a hexadecimal response code.

The supervisory controller 12 supplies the modulator/demodulator 11 with a bit serial response signal 06 including the response code, the code describing the content of the operation command and its own address code. Incidentally, the supervisory controller 12 stores the response code and the like into the memory as needed.

According to the clock signal generated from the received signal 01, the modulator/demodulator 11 modulates the response signal 06, and supplies a modulation output 07 to the pumping laser diode driver 128.

In response to a driving current 08 based on the modulation output 07, the pumping laser diode driver 128 drives the pumping laser diodes 116 in the uplink and downlink optical amplifiers 6a and 6b. Thus, the pumping laser diode 116 generates the pumping light that serves not only as the response optical signal including the content of the response signal 06, but also as the light for amplification.

The WDM coupler 139 combines the pumping light generated by the pumping laser diode 116 with the received optical signal to generate the optical signal including the response optical signal superimposed thereon.

The erbium doped fiber 117 amplifies the optical signal. The amplified optical signal passes through the optical isolator 118, and is transmitted in both directions through the uplink and downlink transmission fibers 104 via the output fibers 120.

Since the optical signal including the response optical signal superimposed thereon is transmitted through the bidirectional transmission fibers 104, the optical receiver 103a in the terminal station 1 that transmits the operation command can receive that optical signal. Accordingly, the terminal station 1 can transmit the next operation command immediately after the arrival of the response to the operation command. This can improve the efficiency of the system because the unduly long waiting time becomes unnecessary which is required for transmitting the next operation command in the conventional supervisory system of the optical amplifier repeater system as shown in FIG. 8.

Next, the operation in step S3 as shown in FIG. 4 will be described in more detail with reference to FIG. 1. The optical receiver 103a in the terminal station 1 receives the optical signal including the response optical signal superimposed thereon. The optical receiver 103a (103b) coverts the received optical signal into an electric signal in the same manner as the optical receiver 103 as shown in FIG. 10. The main electric signal and the auxiliary electric signal obtained by converting the main optical signal and the response optical signal are demodulated by the main signal demodulator 135 and the auxiliary signal demodulator 137 as shown in FIG. 11, respectively. The optical receiver 103a supplies the information processing unit 3 with the response code, the code expressing the content of the operation command and the address code indicating the optical amplifier repeater sub-module 8, all of which are demodulated by the auxiliary signal demodulator 137.

Next, the operation in steps S4 and S5 will be described in more detail with reference to FIG. 1. First, in step S4, in response to the code expressing the content of the operation command and the address code indicating the responding optical amplifier repeater sub-module 8 supplied from the optical receiver 103a, the arithmetic unit 3b in the information processing unit 3 extracts the corresponding expression from the plurality of identification expressions recorded in the storage 3a.

In the instant case, the arithmetic unit 3b in the information processing unit 3 extracts the identification expression for estimating the output power of the pumping laser diode 116 in the optical amplifier repeater sub-module 8. Subsequently, the arithmetic unit 3b converts the output power into the corresponding numerical form by substituting the response code into the identification expression so that the power is expressed in terms of dBm or mW.

In the next step S5, the arithmetic result output unit 3c supplies the numerical value fed from the arithmetic unit 3b to a monitor display, a printer or a higher level system, which are not shown, as the supervisory information.

Figure 6:
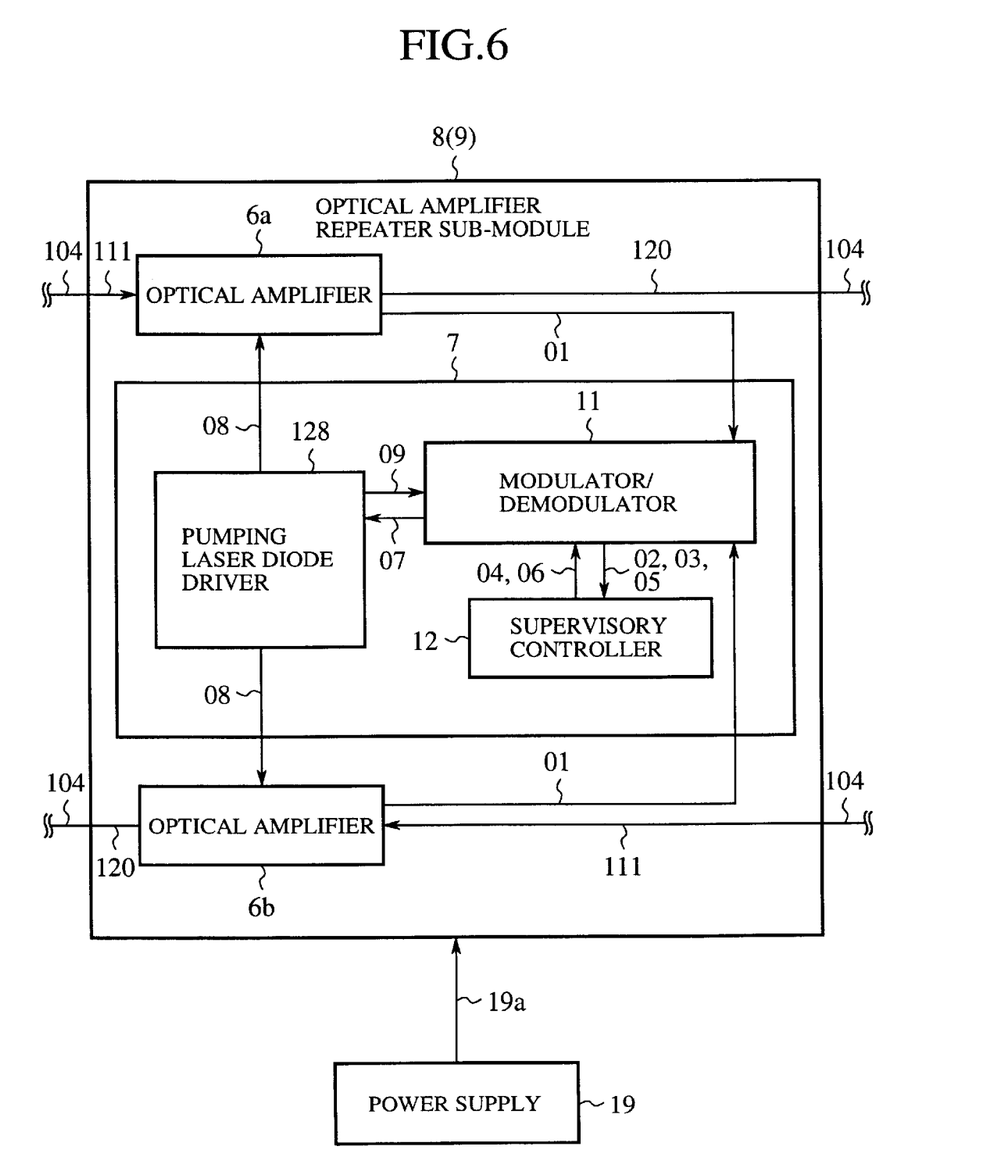
FIG. 6 is a block diagram showing a configuration of an optical amplifier repeater sub-module as shown in FIG. 5.
Figure 7:
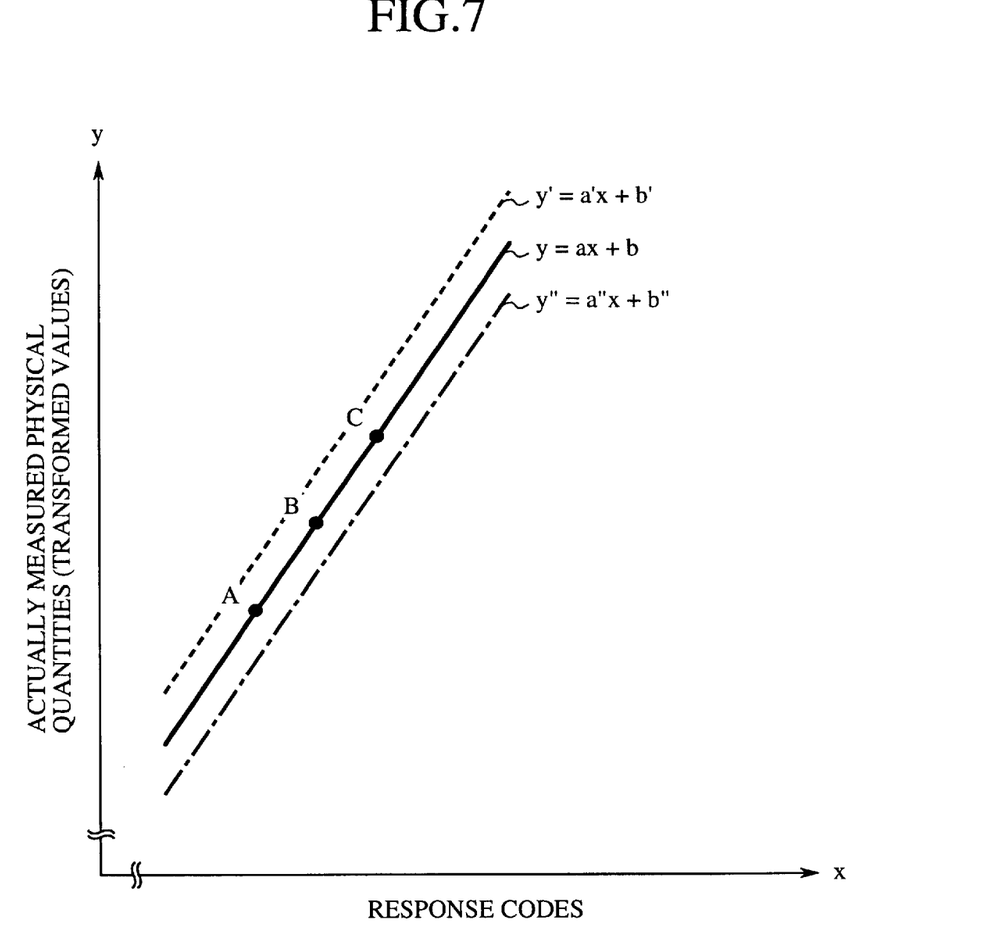
FIG. 7 is a graph illustrating test results by the optical communication test system as shown in FIG. 5.

Next, a method of obtaining the identification expressions to be stored in the storages 3a and 4a will be described with reference to FIGS. 5–7. FIG. 5 is a block diagram showing a configuration of an optical communication test system for obtaining the identification expressions, FIG. 6 is a block diagram showing a configuration of the optical amplifier repeater sub-module as shown in FIG. 5, and FIG. 7 is a graph illustrating identification results of the gain characteristics. In these figures, the same references designate the same or like portions to those of FIGS. 1–4 and FIGS. 8–11, and the description thereof is omitted here. The reference numeral 15 designates an interface for making a man-machine interface to collect characteristic data for the individual supervisory targets of the optical amplifier repeater 5. The reference numeral 16 designates a storage unit for recording the characteristic data about the individual supervisory targets obtained by the test. Reference numerals 17 and 18 each designate terminal test equipment comprising the optical transmitter 102a (102b), optical receiver 103a (103b), interface 15 and storage unit 16. The reference numeral 19 designates a power supply for supplying power to the optical amplifier repeater sub-module 8 via a feeder line 19a. The feeder line 19a corresponds to a feeder line (not shown) for supplying power in series from the terminal station 1 or 2 to the optical amplifier repeaters 5 as shown in FIG. 1. The reference numeral 20 designates the optical communication test system comprising the components 5, 15–19 and 104.

Next, the operation of the optical communication test system 20 will be described with reference to FIGS. 5 and 6. To obtain the identification expression as to the output power of the pumping laser diode 116 as shown in FIG. 3, for example, the interface 15 in the terminal test equipment 17 sends a command to the optical transmitter 102a to transmit the optical signal including the operation command to measure the output power of the pumping laser diode 116 in the optical amplifier repeater sub-module 8. Thus, the optical transmitter 102*a* transmits the optical signal to the optical amplifier repeater 5 through the transmission fiber 104.

Then, the modulator/demodulator 11 and supervisory controller 12 of the optical amplifier repeater 5, which operate in the same fashion as those of FIG. 2, measure the output power of the pumping laser diode 116, and activate the pumping laser diode driver 128 to transmit the response optical signal including the response code to the terminal test equipment 17 and 18 as shown in FIG. 5.

Each optical receiver 103*a* (103*b*) in the terminal test equipment 17 and 18, which operates in the same manner as the optical receiver 103 as shown in FIG. 11, outputs the response code, the code expressing the content of the operation command, and the address code indicating the optical amplifier repeater sub-module 8.

While the modulator/demodulator 11 and supervisory controller 12 in the optical amplifier repeater 5 measure the output power of the pumping laser diode 116, an external measuring device (not shown) measures the output power of the pumping laser diode 116. Thus, two series of data are obtained: one is the response code output from the optical amplifier repeater 5; and the other is the actual physical quantity measured by the external measuring device.

Here, the output power of the pumping laser diode 116 is measured by the external measuring device comprising the same photodetector as the photodetector 129 as shown in FIG. 3.

During the test, the ambient temperature of the optical amplifier repeater 5 is kept constant, and the current flowing through the feeder line 19 from the power supply 19 to the optical amplifier repeater sub-module 8 is varied to take one of a small, middle and large value in a predetermined range. Since the pumping laser diode driver 128 controls the driving current supplied to the pumping laser diode 116 in accordance with the supply power, the changes in the feeder current will result in the changes in the response codes and measured information in response to the changes in the feeder current from the power supply 19, thereby providing a set of resultant data.

In addition, to cope with the temperature variation, the ambient temperature of the optical amplifier repeater 5 is varied up and down in a predetermined range with changing the current flowing through the feeder line 19*a* from the power supply 19 to the optical amplifier repeater sub-module 8 to take one of the small, middle and large values in the predetermined range, to collect the corresponding response codes and measured information as a set of resultant data.

Subsequently, relationships between the response codes and the measured information are obtained. FIG. 7 is a graph illustrating identification results of the characteristics. In FIG. 7, the first axis represents the response codes and the second axis represents the actually measured physical quantity information (transformed values). The broken line represents the identification results when the ambient temperature of the optical amplifier repeater 5 is shifted upward by δ degrees, whereas the dashed-and-dotted line represents the identification results when it is shifted downward by δ degrees.

First, as illustrated in FIG. 7, according to the large, middle and small values of the power fed from the power supply 19, three points A, B and C are plotted on the x-y plane whose y-axis represents the measured information, and the x-axis represents the response codes obtained as the response results. In addition, the linear function $y=ax+b$ is obtained, where a is the gradient and b is the intercept, by the least-squares method that minimizes the sum of squares of the distances between the line and the three points, where a and b are constants, with the intercept b varying depending on the ambient temperature. The linear function gives the relationships between the response codes and the measured information.

Subsequently, the identification expressions are obtained as to the output power of the pumping laser diodes 116 of all the other optical amplifier repeater sub-modules in the same way. The identification expressions are recorded in the storage unit 16 in connection with the address codes proper to the optical amplifier repeater sub-modules.

The identification expressions which are obtained for respective pumping laser diodes 116 and recorded in the storage unit 16 are transferred to the storages 3*a* and 4*a* in the information processing units 3 and 4 as shown in FIG. 1 to be recorded therein. Thus, the arithmetic units 3*b* and 4*b* can obtain the output power y by substituting the response code for x in the identification expressions $y=ax+b$ recorded in the storages 3*a* and 4*a* during the operation. In other words, the supervisory information is obtained which represents the output power in the numerical form. As a result, it becomes possible for the present embodiment 1 of the optical amplifier repeater to supervise or control the individual states of the supervisory targets in the optical amplifier repeaters 5 having some characteristic variations at higher accuracy than the conventional apparatus.

Although its details are skipped here, the present embodiment 1 of the supervisory system and supervisory method of the optical amplifier repeater can deal with the variations in the ambient temperature by using the identification expressions $y'=a'+b'$ and $y''=a''+b''$ as illustrated in FIG. 7, which are obtained by shifting up and down the ambient temperature of the optical amplifier repeater 5 by δ degrees during the operation. In this case, the measured information on the ambient temperature is contained in the response optical signal so that it is used as a parameter for selecting the identification expressions by the arithmetic units 3*b* and 4*b*.

In addition, the present embodiment 1 can collect the identification expressions other than those of the output power of the pumping laser diodes 116, to be stored in the storages 3*a* and 4*a*. For example, the same procedure is applicable to the bias current of the pumping laser diode 116, the input power to the input fiber 111, which is obtained by the photoelectric converter 121, and the output power of the output fiber 120, which is obtained by the photoelectric converter 130. Thus, the response codes and measured information are collected for these measuring targets by using the optical communication test system 20, followed by obtaining the identification expressions, by storing them into the storage units 16, and by transferring them to the storages 3*a* and 4*a* to be recorded.

According to the present embodiment 1 of the optical amplifier repeater supervisory system, it comprises the optical transmitters 102*a*–102*d* each for transmitting the optical signal including the operation command to notify of the states of the supervisory targets; the optical amplifier repeaters 5 each for receiving the optical signal through the transmission fiber 104, and for outputting the response optical signal including the response code in response to the operation command; the optical receivers 103*a*–103*d* each for receiving the response optical signal through the transmission fiber 104; and the information processing units 3 and 4 for converting the response code contained in the response optical signal received by the optical receivers 103*a*–103*d* into the numerical form by using the identification expressions. Here, the information processing unit 3 and 4 include the storages 3a and 4a for recording the identification expressions that link the response codes with the measured information obtained in advance by measuring the prescribed supervisory targets while operating the optical amplifier repeater 5 associated with the operation command; the arithmetic units 3b and 4b for converting the response codes into the corresponding numerical forms using the identification expressions; and the arithmetic result output units 3c and 4c for outputting the results of the calculation results by the arithmetic units 3b and 4b. Thus, the present embodiment 1 offers an advantages of being able to supervise the operation state at higher accuracy, and to deal with the subsequent operation state more appropriately.

According to the present embodiment 1, the identification expressions are obtained in terms of the changes in the response codes associated with the variations in the measured information about the predetermined supervisory targets due to the ambient temperature fluctuations of the optical amplifier repeater 5. Thus, it offers an advantage of being able to provide temperature compensation for the characteristics of the supervisory targets in response to the ambient temperature variations during the operation of the optical amplifier repeaters 5, thereby enabling higher accuracy monitoring.

According to the present embodiment 1, the optical amplifier repeaters 5 each send out the states of the supervisory targets in the form of the response codes, which offers an advantage of being able to limit the information amount of the response optical signal in the optical signal to a rather small amount, thereby avoiding the adverse effect on the main signal.

According to the present embodiment 1, the optical amplifier repeaters 5 each send the response to both the uplink and downlink directions so that the terminal station 1 or 2 that issues the operation command can transmit the next operation command immediately after the arrival of the response. Thus, the present embodiment 1 offers an advantage of being able to increase the operation efficiency because it can reduce the long intervals to be placed between the operation commands in the conventional system to avoid the adverse effect on the main signal resulting from the simultaneous transmission of two or more operation commands in the optical signal.

According to the present embodiment 1, the optical amplifier repeaters 5 are installed between the optical transmitters 102a–102d and the optical receivers 103a–103d through the transmission fibers 104; and the information processing units 3 and 4 record, in the storages 3a and 4a, the plurality of identification expressions applicable to the optical amplifier repeaters 5. Thus, the present embodiment 1 offers an advantage of being able to output the quantitative information for respective supervisory targets, thereby enabling highly accurate supervision.

According to the present embodiment 1 of the optical amplifier repeater supervisory method, it records, in the storages 3a and 4a in advance, the identification expressions, each of which is obtained by linking the response code output from the optical amplifier repeater 5 with the measured information obtained by measuring the predetermined supervisory target by the external measuring device while the optical amplifier repeater 5 is operating which corresponds to the operation command to notify of the state of the supervisory target; and converts the response code obtained during the operation into the numerical form using the identification expressions, and further comprises the step of transmitting the operation command from the optical transmitters 102a–102d to the optical amplifier repeaters 5 through the optical fiber 104; and the step of converting the response code sent from the optical amplifier repeater 5 into the numerical form by using the identification expressions. Thus, the present embodiment 1 offers an advantages of being able to supervise the operation state at higher accuracy, and to control the subsequent operation state more appropriately.

According to the present embodiment 1 of the optical amplifier repeater supervisory method, the identification expressions are obtained in terms of the changes in the response codes associated with the variations in the measured information about the predetermined supervisory targets due to the ambient temperature fluctuations of the optical amplifier repeater 5. This offers an advantage of being able to provide temperature compensation for the characteristics of the supervisory targets in response to the ambient temperature variations during the operation of the optical amplifier repeater 5, thereby enabling high accuracy monitoring.

Incidentally, since the present embodiment 1 obtains the identification expressions for the individual supervisory targets of the optical amplifier repeaters 5, and converts the response codes into the corresponding numerical forms by using them, it is characterized in that the identification expressions can absorb variations in the characteristics of individual components in the repeater system, thereby enabling flexible control depending on the characteristics of the individual repeaters. In addition, as for the components with which the supervisory targets has little characteristic variations, it is unnecessary to store the identification expressions of each component in the storages 3a and 4a. For example, as to the supervisory targets of the optical amplifier repeaters 5 in the same transmission section, it is possible to apply an averaged identification expression, making it possible to reduce the memory capacity of the storages 3a and 4a.

Embodiment 2

A second embodiment of the optical amplifier repeater supervisory system and supervisory method in accordance with the present invention will be described. The present embodiment 2 adds a parameter representing elapsed time to the identification expressions about the supervisory targets. To obtain the identification expressions considering the elapse of the time, the optical communication test system 20 as shown in FIG. 5 carries out the so-called long-term reliability test or accelerated test in which prescribed characteristic tests are performed using a lot of samples under more severe conditions than in the normal operation in terms of the ambient temperature, supply voltages and the like. The identification expressions thus obtained from the measured information about the supervisory targets in accordance with the elapsed time and the response codes are stored in the storages 3a and 4a. In the actual operation, the information processing units 3 and 4 each count the elapsed time based on their internal clock signal (not shown), and select the optimum identification expression.

For example, since the pumping laser diode 116 usually degrades its output power with the elapsed time, using the identification expressions in accordance with the elapsed time can implement the supervision at higher accuracy.

According to the present embodiment 2, the identification expressions are used which take account of the characteristic variations with time of the supervisory targets, that is, the individual components of the optical amplifier repeaters 5. Thus, the present embodiment 2 offers an advantage of being able to implement higher reliability ensuring the long term operation, and to achieve gain stabilization against the characteristic variations with time of the optical amplifier repeaters 5 operating on the basis of the identification expressions.

What is claimed is:

1. A supervisory system of the optical amplifier repeater system in an optical transmission system including two terminal stations and at least one optical amplifier repeater connected between the two terminal stations through an optical fiber, said supervisory system of the optical amplifier repeater system comprising:

an optical transmitter installed in at least one of said two terminal stations for transmitting to said optical amplifier repeater an optical signal including an operation command to notify of a state of a predetermined supervisory target;

a response signal generator installed in said optical amplifier repeater for receiving the optical signal transmitted from said optical transmitter, and for generating a response optical signal including a response code indicative of the state of the supervisory target;

an optical receiver installed in at least one of said two terminal stations for receiving the response optical signal transmitted from said optical amplifier repeater; and an information processing unit connected to said optical receiver for generating a numerical form of the response code included in the response optical signal received by said optical receiver by using a predetermined expression that links the response code with measured information obtained by measuring in advance the supervisory target with an external measuring device during operation of said optical amplifier repeater in response to the operation command.

2. The supervisory system of the optical amplifier repeater system according to claim 1, wherein said information processing unit comprises a storage for recording the expression in advance; an arithmetic unit for converting the response code into the numerical form using the expression; and an arithmetic result output unit for outputting information about the numerical form output from said arithmetic unit.

3. The supervisory system of the optical amplifier repeater system according to claim 2, wherein the expression is obtained in terms of variations in the response code in response to variations in the measured information about the supervisory target due to ambient temperature changes of said optical amplifier repeater.

4. The supervisory system of the optical amplifier repeater system according to claim 2, wherein the expression is obtained in terms of variations in the response code in response to variations in the measured information about the supervisory target due to elapsed time.

5. The supervisory system of the optical amplifier repeater system according to claim 2, wherein a plurality of optical amplifier repeaters are installed between said two terminal stations via the optical fiber, and the expression is obtained for each of said plurality of optical amplifier repeaters to be stored in said storage of said information processing unit.

6. A supervisory method of an optical amplifier repeater in an optical transmission system including two terminal stations and at least one optical amplifier repeater connected between the two terminal stations through an optical fiber, at least one of said two terminal stations including an optical transmitter and an optical receiver, said supervisory method of an optical amplifier repeater comprising the steps of:

transmitting from the optical transmitter to the optical amplifier repeater an operation command to notify of a state of a predetermined supervisory target;

storing a predetermined expression linking measured information with a response code in advance, the measured information being obtained by measuring the predetermined supervisory target by an external measuring device while the optical amplifier repeater is operating in response to the operation command, and the response code being output from the optical amplifier repeater in response to the operation command; and converting the response code which is sent from the optical amplifier repeater to the optical receiver in response to the operation command, into a numerical form by using the predetermined expression.

7. The supervisory method of an optical amplifier repeater according to claim 6, wherein the expression is obtained in terms of variations in the response code in response to variations in the measured information about the supervisory target due to ambient temperature changes of said optical amplifier repeater.

8. The supervisory method of an optical amplifier repeater according to claim 6, wherein the expression is obtained in terms of variations in the response code in response to variations in the measured information about the supervisory target due to elapsed time.

* * * * *